United States Patent [19]
Ouellette

[11] Patent Number: 6,106,220
[45] Date of Patent: Aug. 22, 2000

[54] SLIPSHEET RETAINER FOR BULK DEPALLETIZER/PALLETIZER

[75] Inventor: Joseph F. Ouellette, Glendale, Mo.

[73] Assignee: Ouellette Machinery Systems, Inc., Fenton, Mo.

[21] Appl. No.: 09/150,945

[22] Filed: Sep. 10, 1998

[51] Int. Cl.[7] .................................................. B65H 3/24
[52] U.S. Cl. .................... 414/796.2; 414/799; 414/796.8
[58] Field of Search ................. 414/799, 796.2, 414/796.8, 789.5, 781.6

[56] References Cited

U.S. PATENT DOCUMENTS

| | | |
|---|---|---|
| 2,774,489 | 12/1956 | Guigas . |
| 3,780,884 | 12/1973 | Jones . |
| 3,844,422 | 10/1974 | Smith et al. . |
| 3,865,258 | 2/1975 | Muller .................................. 414/796.8 |
| 3,954,190 | 5/1976 | Howard et al. . |
| 3,974,922 | 8/1976 | Selusnik et al. . |
| 4,032,021 | 6/1977 | Mabey et al. ......................... 414/796.8 |
| 4,058,225 | 11/1977 | Janson . |
| 4,197,046 | 4/1980 | Shank . |
| 4,214,848 | 7/1980 | Verwey et al. . |
| 4,405,276 | 9/1983 | Wiegand ............................... 414/796.8 |
| 4,557,656 | 12/1985 | Ouellette . |
| 4,988,264 | 1/1991 | Winski .................................. 414/796.2 |
| 5,096,369 | 3/1992 | Ouellette . |
| 5,443,356 | 8/1995 | Naldi .................................... 414/796.8 |

FOREIGN PATENT DOCUMENTS

| | | | |
|---|---|---|---|
| 2223782 | 11/1973 | Germany | ............................ 414/796.2 |

*Primary Examiner*—Gregory A. Morse
*Attorney, Agent, or Firm*—Howell & Haferkamp, LC

[57] ABSTRACT

An apparatus that is one part of a conveying system for transferring objects, such as bottles, removes layers of the objects from a pallet on which the layers have been stacked or, in reverse operation, arranges the objects in layers stacked on one another on a pallet. The apparatus may be employed to depalletize objects or to palletize objects, where in the depalletizing mode of operation the apparatus has a slipsheet retainer that holds a slipsheet below a layer of objects being depalletized from the stacked layers of objects on the pallet and prevents the slipsheet from moving with the layer of objects as the layer of objects is depalletized.

19 Claims, 7 Drawing Sheets

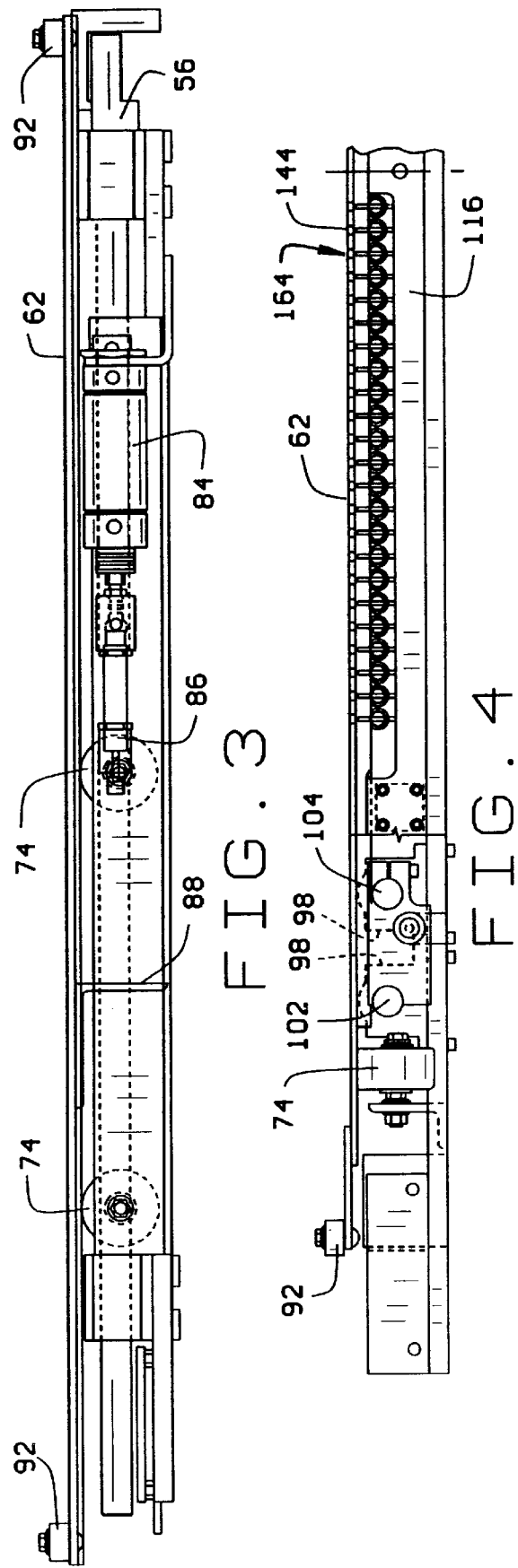

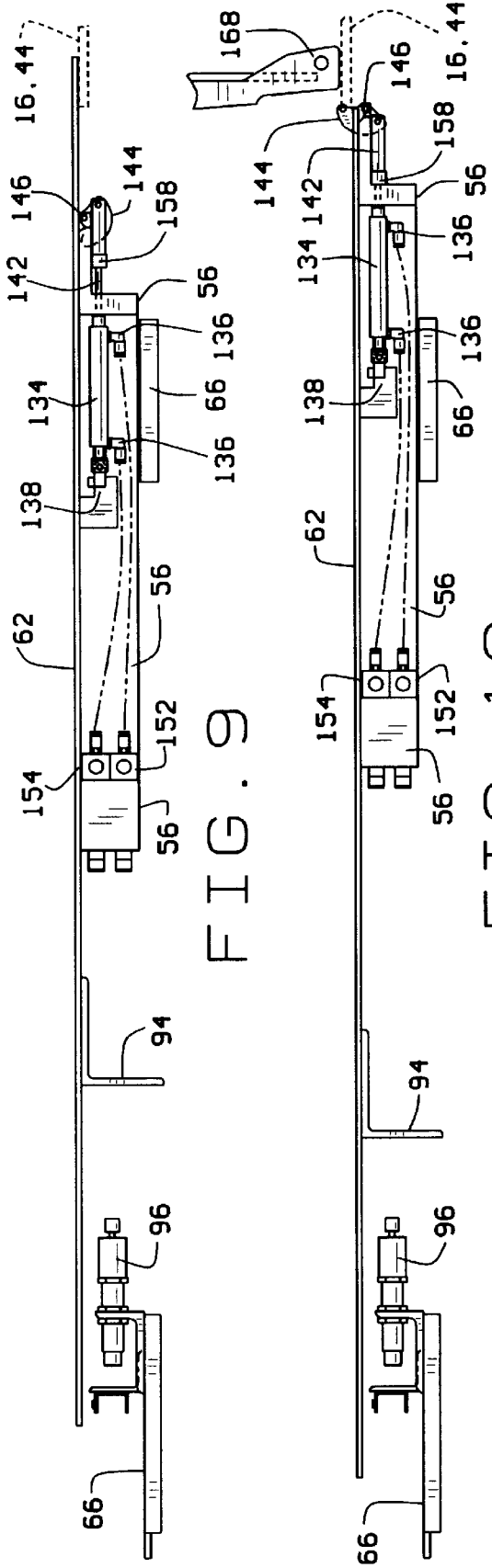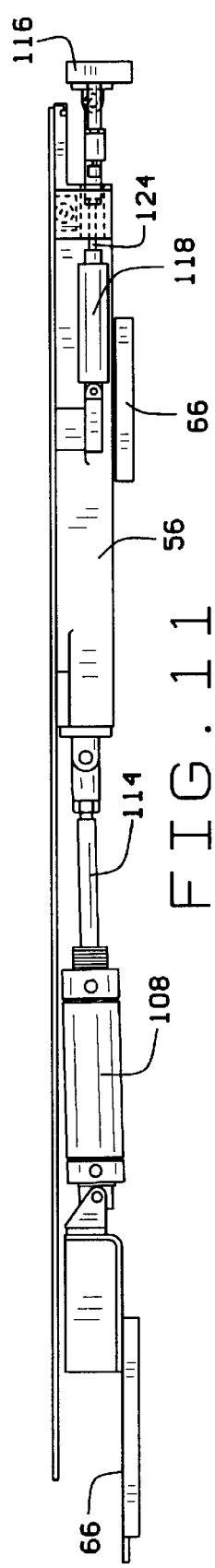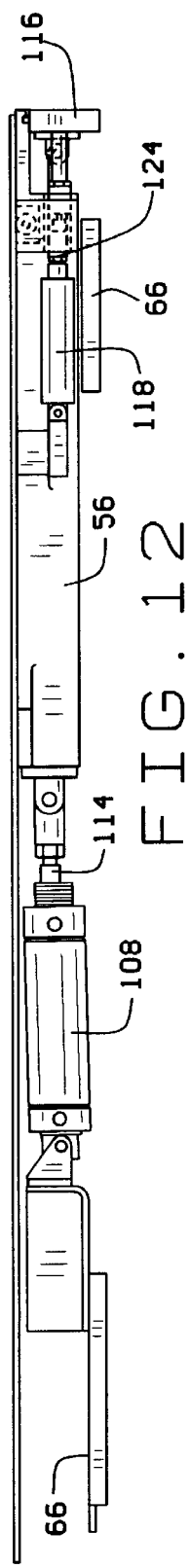

SLIPSHEET RETAINER FOR BULK DEPALLETIZER/PALLETIZER

BACKGROUND OF THE INVENTION (1) Field of the Invention

The present invention pertains to an apparatus that is one part of a conveying system for transferring objects, such as bottles, where the apparatus removes layers of the objects from a pallet or, in reverse operation, arranges the objects in layers on a pallet. In particular, the present invention pertains to an apparatus that may be employed to depalletize objects or to palletize objects, where in the depalletizing mode of operation the apparatus has a slipsheet retainer that holds a slipsheet below a layer of objects being depalletized from the stacked layers of objects and prevents the slipsheet from moving with the layer of objects as the layer of objects is depalletized.

(2) Description of the Related Art

Many containers such as bottles, cans, jars, jugs, etc. are packaged on pallets for transportation from a manufacturer to a user of the container or object. The pallet loads often include layers of the objects, each separated by a paperboard slipsheet, stacked on top of a pallet constructed of wood. The layers of objects and the slipsheets on which the layers rest are secured on the top surface of the pallet by banding, plastic sheet wrap or by other equivalent methods. The pallet loads facilitate the transportation of a significant number of the objects on each pallet load from the manufacture of the objects, through distribution and ultimately to the end user of the objects.

Upon receipt of a pallet load of objects the user of the objects removes the banding or sheet wrap that secured the objects to the top surface of the pallet and then must unload the pallet by removing the topmost layer of objects on the pallet load, removing the slipsheet that supported the topmost layer, then removing the next lower layer of objects from the pallet load and its slipsheet until the pallet is completely unloaded. In many conveyor systems in which objects are unloaded from pallet loads and/or are loaded onto pallets, the faster the system can operate to unload and/or load pallets the more cost efficient is its operation. With manual unloading and loading of pallets being long recognized as slow and expensive, a number of different types of machines have been developed over time that quickly perform the function of unloading and/or loading pallets. These machines are referred to as depalletizers and/or palletizers in the conveying industry. Examples of these types of machines are described in U.S. Pat. Nos. 2,774,489, 3,780,884; 3,844,422; 3,954,190; 3,974,922; 4,058,225; 4,197,046; 4,214,848, and 4,557,656 the disclosures of all of which are incorporated herein by reference.

FIG. 1 is a schematic representation depicting a depalletizer, palletizer apparatus that comprises many features found in other prior art apparatus. The machine shown in FIG. 1 includes an object infeed section A, an elevator section B, and an object outfeed section C. As stated earlier, machines of this type are known in the prior art and various examples of these machines are disclosed in the above-listed patents. In order to simplify the explanation of the construction and operation of these types of machines the drawing of the machine in FIG. 1 has been simplified, deleting many of the intricate component parts of the machine, examples of which are disclosed in the above-listed patents, that enable the machine to function in the manner to be described. The machine will be described as depalletizing and palletizing objects, in this case plastic blow-molded bottles as shown in FIG. 1. It should be understood that "objects" is intended to mean any of the various different types of objects that may be transported in pallet loads and is not intended that the interpretation be limited to plastic bottles.

The sections of the machine shown in FIG. 1 are all supported by a framework 10. At the object infeed section A, the framework supports the end of a conveyor depicted as a belt and pulley conveyor 12. However, any other type of known conveyor may be employed to transport pallets of objects to the machine infeed section A. As shown in FIG. 1, the infeed conveyor 12 has transported a pallet load into the object infeed section A. The pallet load is comprised of several layers of objects 14, in this example plastic bottles, that are each separated from each other by a paperboard slipsheet 16 positioned under each layer of objects 14. The layers of objects 14 and the slipsheets 16 are all supported on a pallet 18, for example a wooden pallet although pallets are constructed of other types of materials. As shown in FIG. 1, the banding or plastic sheetwrap that usually secures the layers of objects 14 and slipsheets 16 to the top surface of the pallet 18 has been removed. With the pallet load of objects 14 positioned by the infeed conveyor 12 in the object infeed section A, the control system of the machine has precisely positioned the pallet load relative to the sections of the machine to permit the quick depalletizing of each layer of objects in the pallet load. The direction of movement of the infeed conveyor 12 may be reversed for operation in a palletizing mode.

Shown at the top of the object infeed section A is a sweeper mechanism 22. The sweeper mechanism 22 has a generally rectangular base 24 at its top that is supported in the machine to move horizontally across the length of the machine between the object infeed section A and the object outfeed section C, and also to move vertically in the elevator section B as will be explained. Suspended from four edges of the base 24 are four side plates 26, only three of which are visible in FIG. 1, that are suspended from the four edges of the base 24. A pivot rod supports each of the side plates 26 from each edge of the base 24 for relative pivoting movement of the side plates 26 to the base 24 as represented by the arrows in FIG. 1. The pivoting movement of the side plates 26 is controlled by pneumatic actuators that can be controlled to pivot the side plates 26 upwardly to positions that are substantially horizontal and parallel with the base 24.

A gripper mechanism 28 is also supported by the frame in the object infeed section A of the machine. The gripper mechanism 28 is supported by the frame for vertical movement of the mechanism across the entire vertical height of the object infeed section A. The gripper mechanism 28 comprises a pair of jaws 32 that are controlled to close and grip the back edge of a slipsheet 16 in depalletizing operation of the machine as will be explained.

An elevator mechanism 34 is supported in the elevator section B of the machine. The elevator mechanism 34 is supported for vertical movement across the vertical height of the elevator section B. The elevator mechanism 34 has a smooth, flat top sliding surface 36 that is controlled by the control system of the machine to be selectively positioned by the elevator mechanism adjacent the tiers of slipsheets 16 and the top surface of the outfeed conveyor to be described. In some prior art machines of this type the elevator mechanism 34, the sweeper mechanism 22 and the gripper mechanism 28 are all part of the same unit and move together vertically. However, these mechanisms can also be made to move independently of each other.

An end of an outfeed conveyor 38 is supported in the machine frame in the object outfeed section C. The outfeed conveyor 38 is depicted as a belt and pulley conveyor but may be any other type of conveyor. As with the infeed conveyor 12, the conveying direction of the outfeed conveyor 38 may be reversed in order to employ the machine in both a depalletizing mode and a palletizing mode.

The operation of the representative depiction of the prior art depalletizer/palletizer shown in FIG. 1 is similar to the operation of most prior art palletizer/depalletizers. In the depalletizing mode of operation, a pallet load consisting of a pallet 18 having layers of objects 14 arranged thereon with each layer separated by a slipsheet 16 is transported by the infeed conveyor 12 in a downstream direction until the pallet load is in its proper position in the object infeed section A as shown in FIG. 1. The positioning of the pallet load in the object infeed section is controlled by sensors so that the layers of objects 14 and their slipsheets 16 are in desired positions relative to the elevator section B and the gripper mechanism 28. If the sweeper mechanism 22 is positioned in the object infeed section A as the pallet load is conveyed to this section it must be moved completely to the top of the infeed section A in the position shown in FIG. 1 and at least the one side plate 26 shown at the right of the sweeper mechanism 22 in FIG. 1 must be raised to provide clearance inside the remaining three depending side plates 26 of the sweeper mechanism to receive the topmost layer 42 of objects on the pallet load. If the sweeper mechanism 22 is positioned in the elevator section B or the object outfeed section C, it is first raised to its topmost position and then the same side plate 26 facing the pallet load is raised. The sweeper mechanism is then moved horizontally over the topmost layer 42 of objects to its position shown in FIG. 1. With the sweeper mechanism 22 positioned over the topmost layer 42 of objects, the side plates 26 are moved to their downwardly depending position where their interior, mutually opposed surfaces come into contact around the grouping of objects 14 in the topmost layer 42. Also, prior to insertion of the pallet load in the object infeed section A by the infeed conveyor 12, the gripper mechanism 28 must be raised to the top of the object infeed section A where it will be high enough to clear the topmost layer of objects 42 of the pallet load as they are moved into the object infeed section.

Next, the elevator mechanism 34 is raised so that the sliding surface 36 is adjacent the topmost slipsheet 44 as shown in FIG. 1. With the sliding surface 36 of the elevator mechanism 34 adjacent the topmost slipsheet layer 44, the gripper mechanism 24 is lowered from its position at the top of the object infeed section until it also is adjacent the topmost slipsheet layer 44 on the opposite side of the elevator mechanism sliding surface 36 as shown in FIG. 1. The jaws 32 of the gripper mechanism 28 are then operated to clamp along the rearward edge of the topmost slipsheet layer 44 as shown in FIG. 1.

With the jaws 32 of the gripper mechanism 28 holding the rearward end of the topmost slipsheet layer 44, the sweeper mechanism 22, with its side plates 26 all depending downwardly, next moves to the left as shown in FIG. 1. This motion of the sweeper mechanism 22 slides all of the objects in the topmost layer 42 to the left sweeping the objects off of the topmost slipsheet 44 held by the gripper mechanism 28 and onto the top sliding surface 36 of the elevator mechanism 34. This horizontal movement of the sweeper mechanism 22 is controlled to position all of the objects in the topmost layer 42 on the elevator mechanism sliding surface 36, and then the horizontal movement of the sweeper mechanism 22 is stopped by the control system of the machine.

With the topmost layer of objects 42 positioned on the sliding surface 36 of the elevator mechanism 34, the gripper mechanism 28 is disengaged and the elevator mechanism then moves vertically downward. As the elevator mechanism moves vertically downward the sweeper mechanism 22 is controlled to travel with the elevator thereby holding the topmost layer of objects 42 in a group on the sliding surface 36 of the elevator mechanism. The downward movement of both the elevator mechanism and the sweeper mechanism continues until the sliding surface 36 of the elevator mechanism is positioned adjacent the outfeed conveyor 38.

With the sliding surface 36 of the elevator mechanism positioned adjacent the outfeed conveyor 38, the sweeper mechanism 22 then moves horizontally to the left as shown in FIG. 1, sweeping the topmost layer of objects 42 onto the outfeed conveyor 38. At this point in its operation, the outfeed conveyor 38 is not activated or operates for a short time as the sweeper mechanism 22 sweeps the topmost layer of objects 42 onto the stationary outfeed conveyor 38. The sweeper mechanism is controlled to position all of the objects of the topmost layer on the outfeed conveyor, and then to raise vertically to the top of the object outfeed section C. The sweeper mechanism 22 then moves horizontally to the right as viewed in FIG. 1 across the elevator section B to the top of the object infeed section A. Simultaneously with this movement of the sweeper mechanism 22, the elevator mechanism 34 raises in the elevator section B until the sliding surface 36 of the mechanism is positioned adjacent the next lower slipsheet 46 of the pallet load. With the elevator mechanism in place adjacent the next lower slipsheet 46, the sweeper mechanism 22 moves downwardly in the object infeed section A to a position where the base 24 of the mechanism is just above the next lower layer of objects 48 and its side plates 26 surround all of the objects in this layer. The gripper mechanism 28 also moves downward and grips the next slipsheet 46. The sweeper mechanism 22 then moves to the left in the same manner as described earlier to sweep off the next lower layer of objects 48 together with the slipsheet 44 on top of the layer of objects onto the sliding surface 36 of the elevator mechanism. The process continues as described earlier until all of the layers of objects are swept off the pallet 18 and onto the outfeed conveyor 38. The slipsheets 16 left on top of the layer of objects that have been depalletized are later removed downstream in the conveyor system.

Alternatively, in the operation of prior art machines of this type, once the sweeper mechanism 22 has swept the layer of objects from the sliding surface of the elevator mechanism 34 onto the outfeed conveyor 38, both the elevator mechanism and sweep mechanism together move vertically upwardly in the elevator section with the elevator mechanism 34 being controlled to stop adjacent the next lower slipsheet 46 and the sweeper mechanism 22 moving to the top of the elevator section. The sweeper mechanism 22 then moves horizontally from the elevator section B to the object infeed section A and then vertically downward over the next lower layer of objects 38 to be swept out of the object infeed section off of the pallet load.

Also in the operation of prior art machines of this type, depending on the size of the objects being swept from the pallet load, it may be necessary for the control system of the machine to raise the side plates 26 of the sweeper mechanism 24 as it moves horizontally over the pallet load after the topmost layer of objects 42 has been swept from the pallet load.

It can be seen that when the last layer of objects 52 has been swept off the last slipsheet 54 and onto the elevator sliding surface 36, the object infeed section A of the machine is empty except for the presence of the pallet 18. In prior art machines of this type, there are various different types of mechanism that are employed to remove the pallet 18, for example a separate conveying system for the emptied pallet that would extend transverse to the flow path from the infeed conveyor 12 through the machine to the outfeed conveyor 38. With the pallet removed from the object infeed section A, this section of the machine is prepared to receive the next pallet load of objects, even while the sweeper mechanisms 22 is sweeping the last layer of objects 52 across the elevator sliding surface 36 onto the outfeed conveyor 38. When the last layer of objects 52 is removed from the pallet the gripper mechanism 24, holding the last slipsheet 54 on the top surface of the pallet 18, releases the slipsheet so that both the pallet and slipsheet may be removed from the object infeed section A. However, at this time the gripper mechanism 28 is toward the bottom of the object infeed section A just above the infeed conveyor 12. The infeed conveyor 12 must then wait until the gripper mechanism 28 is raised up to the top of the object infeed section A so that the next pallet load of objects can be moved into the object infeed section on the infeed conveyor 12. This movement of the gripper mechanism 28 out of the path of pallet loads on the infeed conveyor 12 delays the time in which the next pallet load can be moved into the object infeed section and the depalletizing of this pallet load can commence. With machines of this type being more cost efficient by depalletizing layers of objects from a pallet load as quickly as possible, any delay in the depalletizing operation such as that caused by the repositioning of the gripper mechanism 28 back to the top of the object infeed section A lowers output efficiency and thereby increases the cost of operating the conveyor system.

SUMMARY OF THE INVENTION

The present invention provides an improvement to a depalletizer/palletizer machine such as that shown in FIG. 1 by replacing the slipsheet gripper mechanism 28 of the prior art machine with a slipsheet retainer that, at all times of its operation, is not positioned in the path of pallet loads transferred by the infeed conveyor 12 into the object infeed section A of the machine. Furthermore, the slipsheet retainer of the invention may be employed on a machine that is strictly a depalletizer, or may be employed on a machine that operates as both a depalletizer and a palletizer. Furthermore, the slipsheet retainer of the invention includes improvements to the sweeper mechanism side plates 26 that enhance the ability of the slipsheet retainer to hold back the slipsheet 16 below the layer of objects being swept from the pallet load by the sweep mechanism even when edges and corners of the slipsheet have been bent and when one or more objects around the peripheries of the layers of objects in the pallet load have fallen from their layer. The slipsheet retainer of the invention also comprises a mechanism for engaging against the next lower object layer as the topmost layer is being swept from the pallet load to hold the objects in the next lower layer as the layer above them is being swept off the pallet load and onto the elevator mechanism sliding surface.

The improvement of the invention provide a series of pneumatically actuated fingers on the leading edge of the elevator mechanism sliding surface closest to the pallet load. The fingers are positioned beneath the sliding surface of the elevator mechanism and are controlled to raise through slots to positions just above the sliding surface of the mechanism. With the fingers raised, they are in position to engage the leading edge of the slipsheet of the topmost layer of objects in the pallet load as that layer of objects is swept by the sweeper mechanism onto the elevator sliding surface. The pneumatic force holding the fingers in their raised position is adjustable to be sufficient to restrain the slipsheet from moving with the topmost layer of objects as the topmost layer of objects slide across the slipsheet by the motion of the sweeper mechanism, but is not a sufficient force to obstruct the sliding movement of the layer of objects. As a result, as each object in the group of the top layer of objects passes into engagement with the pneumatically raised fingers the objects cause the fingers to pivot rearwardly against their pneumatic pressure permitting the objects to pass causing some fingers to deflect according to the contour of the objects as the objects are swept forward over the deflected fingers. Once the object has passed over the fingers, the fingers pressed downwardly by the passage of the object return to their raised positions under the force of the pneumatic pressure. With the staggered arrangement of objects in each layer on the pallet load there are always a number of pneumatically raised fingers in engagement with the edge of the slipsheet retaining the slipsheet from moving with the layer of objects being swept by the sweeper mechanism.

Each of the fingers is dimensioned to project a sufficient distance above the elevator mechanism sliding surface to engage the edge of the slipsheet even if the edge is bent upwardly. Where the slipsheet retainer encounters an edge of a slipsheet that has a significant bend, the side plate of the sweeper mechanism closest to the elevator mechanism also has a plurality of pneumatically actuated arms that extend downwardly from the side plate and press down on the top of the upper most slipsheet at its edge closest to the elevator mechanism. This insures that the leading edge of the slipsheet is positioned adjacent the raised fingers of the slipsheet retainer so that the fingers will engage the edge and prevent the slipsheet from sliding onto the elevator mechanism as the sweeper mechanism slides the topmost layer of objects onto the sliding surface of the elevator mechanism.

Together, the plurality of pneumatic fingers on the sliding surface of the elevator mechanism and the plurality of pneumatic arms on the sweeper mechanism side plate retain the slipsheet below the topmost layer of objects on the pallet load as that layer of objects is swept off of the slipsheet and onto the sliding surface of the elevator mechanism. In palletizing operations, the plurality of fingers of the slipsheet retainer are lowered below the elevator mechanism sliding surface and held in these retracted positions.

The slipsheet retainer of the invention also includes a pneumatically actuated hold back bar that is positioned just below the retainer fingers and extends outwardly from the elevator mechanism to engage the next lower layer of objects on the pallet load. The hold back bar ensures that objects in the next lower layer of objects do not fall over as the sweeper mechanism sweeps the topmost layer of objects from the slipsheet above the next lower layer of objects.

Still further, the slipsheet retainer of the invention includes a mechanism that moves the sliding surface of the elevator mechanism horizontally relative to the elevator mechanism. For depalletizing operations, this mechanism moves the sliding surface about four inches toward the pallet load thereby minimizing the distance between the slipsheet and the elevator mechanism sliding surface across which the topmost layer of objects must be swept by the sweeper mechanism. For palletizing operations, the sliding surface of the elevator mechanism is controlled to extend six inches from the elevator mechanism spanning the gap between the elevator mechanism and overlapping the slipsheet on the pallet in the object infeed section onto which layers of objects are to be loaded.

The above-described slipsheet retainer provides an effective mechanism to restrain the movement of the topmost slipsheet of a pallet load as the topmost layer of objects on the pallet load is depalletized without causing a delay to the movement of the next pallet load of objects to be depalletized. It also provides a mechanism that effectively restrains slipsheets as layers of objects are unloaded from a pallet load even where the slipsheet has been damaged and the edges of the slipsheet have been significantly bent upwardly or downwardly. The slipsheet retainer of the invention may be used in a machine that both depalletizes and palletizes, or can be easily adapted to perform only the depalletizing operation.

BRIEF DESCRIPTION OF THE DRAWINGS

Further objects and features of the invention are revealed in the following detailed description of the preferred embodiments of the invention and in the drawing figures wherein:

FIG. 3 is a left-side elevation view of the platform of FIG. 2;

FIG. 4 is a half-section front elevation view of the platform of FIG. 2;

FIG. 9 is a side elevation view of the platform and slide plate along line A—A of FIG. 2 showing a retaining finger retracted;

FIG. 10 is a side elevation view similar to that of FIG. 9 showing the retaining finger extended;

FIG. 11 is a side elevation view of the platform and slide plate along line B—B of FIG. 2 showing a hold back bar extended;

FIG. 12 is a side elevation view similar to that of FIG. 11 showing the hold back bar retracted;

DETAIL DESCRIPTION OF THE PREFERRED EMBODIMENTS

Figure 1:
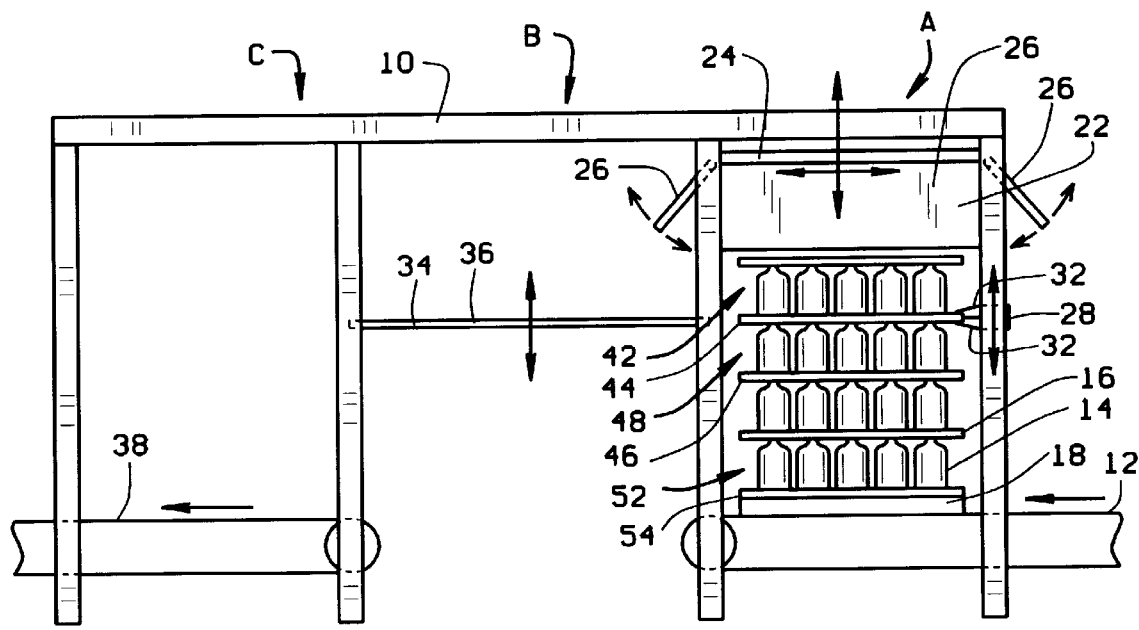
FIG. 1 is a schematic representation of a prior art depalletizing/palletizing machine.

The slipsheet retainer of the present invention is basically comprised of improvements to the elevator mechanism of a depalletizer/palletizer such as that shown in FIG. 1, and to a side plate of a sweeper mechanism of a depalletizer/palletizer such as that shown in FIG. 1. However, it should be understood that the improvements provided by the invention may be employed in various different types of depalletizer/palletizers, and may also be employed in machines that perform solely the depalletizing function. Because the slipsheet retainer of the invention is an improvement to prior art depalletizer/palletizers, it will be described as being applied to the machine schematically depicted in FIG. 1, it being understood that it could be applied to various different types of depalletizing/palletizing machines.

The slipsheet retainer of the present invention is basically comprised of a platform and a sliding plate that are mounted on top of the elevator mechanism 34 of the depalletizing/palletizing machine. The platform is mounted on the elevator mechanism for horizontal reciprocating movement toward and away from the object infeed section A and relative to the elevator mechanism 34. The sliding plate is mounted on top of the platform for horizontal reciprocating movement toward and away from the object infeed section A and relative to both the platform and the elevator mechanism depending on whether it is being employed in a depalletizing or palletizing mode. In the preferred embodiment of the invention, the horizontal reciprocating stroke of the platform is four inches. The horizontal reciprocating stroke of the sliding surface is four inches when employed in a depalletizing mode and six inches when employed in a palletizing mode.

Figure 5:
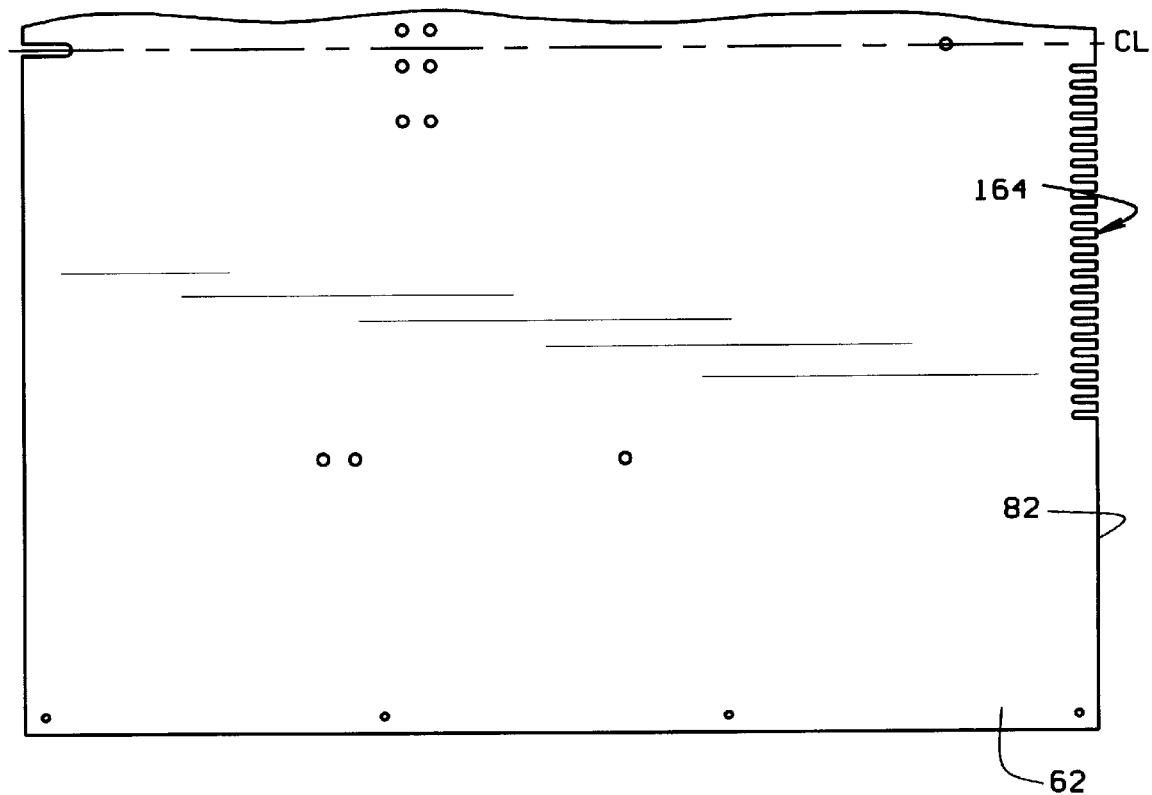
FIG. 5 is a half-section top plan view of a sliding plate that covers the platform of FIG. 2.
Figure 2:
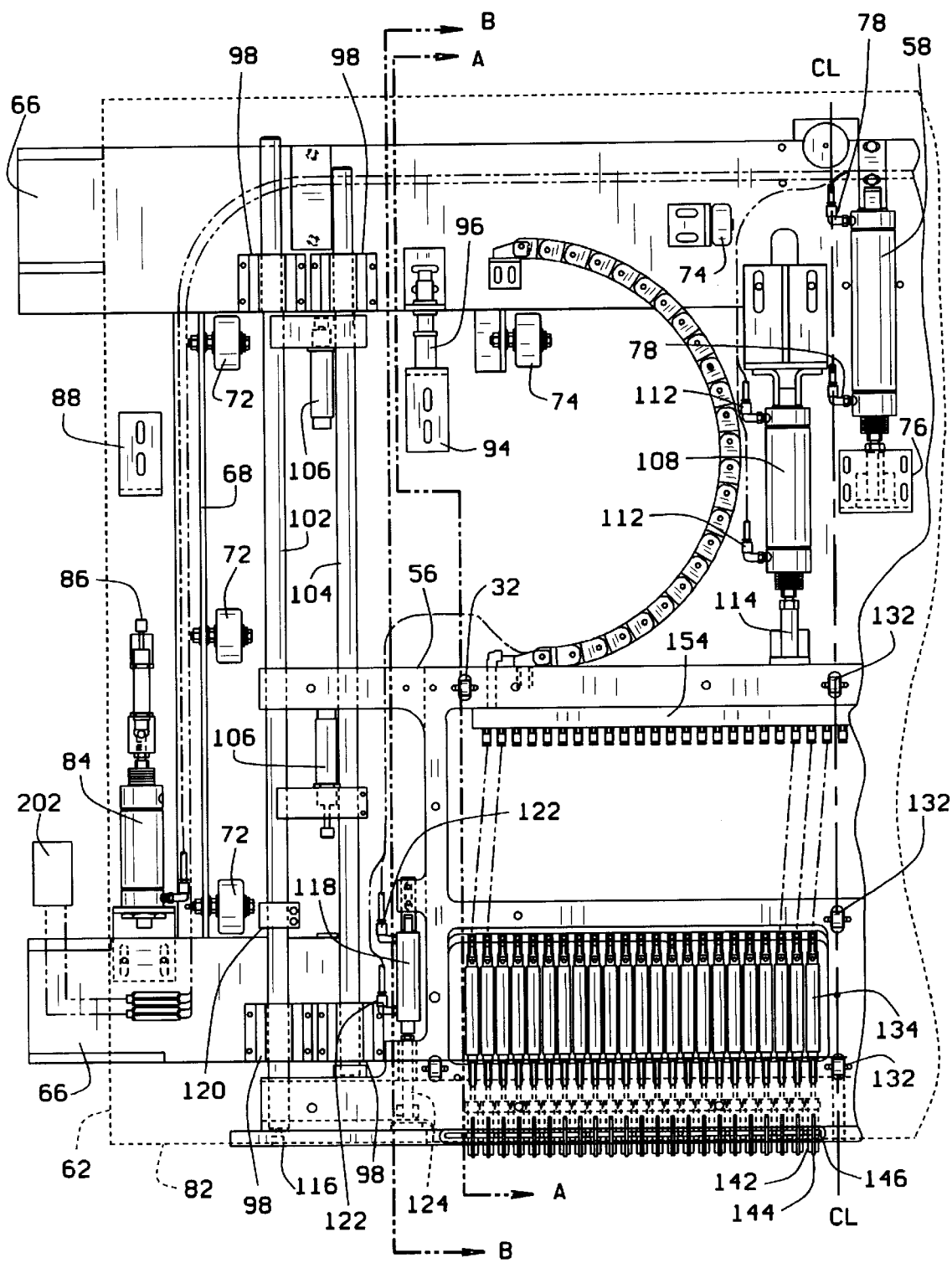
FIG. 2 is a half-section view of a platform of the retaining mechanism of the invention mounted on portions of an elevator.

FIG. 2 is a half-section plan view of the platform 56 of the present invention. In FIG. 2 the view is downward on the top of the platform and the half-section of the platform not shown to the right of the center line CL is a mirror image of the left-half section of the platform shown in FIG. 2 except for the presence of the pneumatic actuator 58 which is shown on the right-half section of the drawing and is not duplicated on the left-half section of the drawing. The sliding plate 62 is shown in half-section in FIG. 5. The right-half section of the sliding plate to the right of the center line CL of FIG. 5 is a mirror image of the left-half section shown except for the presence of fastener holes for the actuator 58 which will be explained. The sliding plate lays over the top of the platform shown in FIG. 2 and its outside dimension is represented by the dashed line 62 in FIG. 2.

Referring to FIG. 2, the platform includes a pair of cross-braces 66 that are secured to the top of the elevator mechanism 34. Extending longitudinally between the cross-braces is an angle bar 68 supporting three rollers 72. Two additional rollers 74 are also supported by the top cross-brace as viewed in FIG. 2. The rollers 72, 74 as well as other rollers to be described, support the slide plate 62 for longitudinally reciprocating movement over the platform. The actuator 58 includes a cylinder connected to the brace 66 and a piston rod which extends from the cylinder and is connected to the underside of the slide plate 62 by a bracket 76. By selectively supplying controlled pressure to the inlets 78 at the opposite ends of the actuator cylinder, the actuator extends and retracts the bracket 76 and thereby extends and retracts the slide plate 62 through its horizontal stroke movement. By supplying pneumatic pressure to the actuator 58 to extend the bracket 76, the slide plate 62 is moved through its full six inch extended stroke from the elevator section B toward the object infeed section A of the machine in FIG. 1 and overlapping the slipsheet. In this extended position of the slide plate it is positioned for a palletizing operation where the leading edge 82 of the slide plate is positioned over the slipsheet in the pallet load on which a layer of objects is to be added. As explained earlier, the six inch length of stroke for palletizing is preferred, however the length of the stroke can be adjusted.

For depalletizing operation it is preferred that the slide plate 62 only be extended four inches longitudinally from the elevator mechanism 34 toward the object infeed section A. Therefore, the six inch stroke of the actuator 58 must be reduced by two inches. This is accomplished by a stroke limit actuator 84. The stroke limit actuator 84 is comprised of a cylinder that is attached to the lower cross-brace shown in FIG. 2, the cross-brace closest to the object infeed section A. A piston rod having a shock absorber 86 at its end extends from the cylinder 84. The piston rod shock absorber 86 is shown in its retracted position relative to the cylinder 84. The piston rod is retracted by a spring contained in the cylinder. With the piston rod shock absorber retracted, the actuator 58 may extend the slide plate 62 its full six inch stroke on extension of the bracket 76 from the actuator cylinder. However, when the pneumatic pressure system is controlled to provide pneumatic pressure to the stroke limit actuator 84, the piston rod shock absorber 86 is extended two inches, its full length of extension. With the piston rod shock absorber 86 extended, operation of the actuator 58 to move the slide plate 62 will cause a stop bracket 88 secured to the underside of the slide plate to contact the piston rod shock absorber 86 of the stroke limit actuator 84 resulting in the full horizontal stroke of the slide plate 62 being limited to only four inches. As explained earlier, the limited four inch stroke of the slide plate is employed in depalletizing operations where the leading edge 84 of the slide plate is positioned adjacent the pallet load and the slipsheet 44 adjacent to which the elevator mechanism 34 has been moved. Therefore, on extension of the actuator 58 the slide plate 62 is extended its full six inch stroke from the elevator section B into the object infeed section A adjacent the pallet load, and on actuation of the stroke limit actuator 84 and subsequent actuation of the actuator 58 the slide plate 62 is extended its four inch stroke from the elevator section B into the object infeed section A.

FIG. 3 shows a side elevation view of the slide plate 62 resting on the rollers 74 above the platform 56. The relative positions of the stroke limit actuator 84 and the piston rod shock absorber 86 to the stop bracket 88 are also shown. FIG. 9 shows the relative position of the sliding plate 62 to the platform 56 in the fully extended position of the sliding plate, and FIG. 10 shows the relative positions between the sliding plate 62 and the platform 56 in the retracted position of the slide plate relative to the platform. Also shown in FIGS. 3 and 4, positioning rollers 92 are provided at the corners of the slide plate 62. The positioning rollers 92 engage against portions of the elevator mechanism 34 that are not shown in the drawing figures and maintain the orientation of the slide plate 62 relative to the platform 56 and the elevator mechanism 34 so that the horizontal reciprocating movement of the slide plate is along a straight line that is parallel to the center line CL of the slide plate and the platform. An additional stop bracket 94 is attached to the underside of the slide plate 62 and a shock absorber 96 is mounted on the cross-brace 66 (shown at the top of FIG. 2) in a position where it will engage the stop bracket 94 when the slide plate 62 is retracted by the actuator 58. The engagement of the stop bracket 94 with the shock absorber 96 absorbs shock and positively positions the slide plate 62 when it is retracted to its at home position by the actuator 58.

Pairs of trunions 98 are mounted side by side on each of the cross-braces 66. Slide rods 102, 104 extend through the pairs of trunions 98. The pairs of slide rods 102, 104 are supported in the trunions 98 for sliding movement of the rods. The platform 56 is secured on the innermost rods 104 so that the slide rod 104 supports the platform for sliding reciprocating movement in the trunions 98. A pair of platform shock absorbers 106 are secured to the innermost guide rods 104 in positions where the rearward most shock absorber will engage with the rear cross-brace 66 (shown at the top of FIG. 2) to absorb shock and positively position the platform 56 relative to the cross-brace 66 and the elevator mechanism 34 when the platform is moved to its retracted position, and the forward most platform shock absorber 106 will engage with the forward cross-brace 66 when the platform 56 is moved to its extended position to absorb shock and positively position the platform relative to the cross-brace 66 and the elevator mechanism 34.

The platform actuator 108 controls the extension and retraction of the platform 56 relative to the cross-braces 66 of the elevator mechanism 34. The platform actuator 108 includes a cylinder having a pair of pneumatic pressure inlets 112 and a piston rod 114 secured to the rearward end of the platform 56. On selective supply of pneumatic pressure to the platform actuator 108, the piston rod 114 is extended from the actuator cylinder causing the platform 56 and its slide rod 104 to move relative to the trunions 98 and the cross-braces 66 to its extended position. At its extended position the forward most platform shock absorber 106 engages against the cross-brace 66 shown at the bottom of FIG. 2 to absorb shock and limit the extension of the platform from the cross-brace 66 and the elevator mechanism 34 to four inches. With controlled selective supply of pneumatic pressure to the platform actuator 108 the piston rod 114 is retracted back into the actuator cylinder causing the platform 56 and its slide rods 104 to again slide through the trunions 98 until the rearward platform shock absorber 106 engages against the rearward elevator mechanism cross-brace 66 shown at the top of FIG. 2 to thereby absorb shock and positively position the platform relative to the elevator mechanism in its at home position.

A hold back bar 116 extends across the front edge of the platform 56. The hold back bar 116 is supported by the outer pair of slide rods 102 in a pair of trunions 98 on the elevator mechanism cross-braces 66. The support of the hold back bar 116 by the slide rod 102 in the trunions 98 enables the bar and the slide rod to reciprocate horizontally relative to the elevator mechanism cross-braces 66 and relative to the platform 56. A hold back bar actuator 118 is mounted between the platform 56 and the hold back bar 116. The actuator includes a pneumatic cylinder having a pair of separate pneumatic pressure inputs 122 and a piston rod 124 extending from the actuating cylinder to the hold back bar 116. A controlled selective supply of pressure to the hold back bar actuator 118 extends the piston rod 124 from the actuator cylinder causing the hold back bar and its attached slide rods 102 to move relative to the trunions 98, the elevator mechanism cross-braces 66 and the platform 56, positioning the hold back bar 116 at a spaced position forward of the platform 56 as shown in FIG. 11. Selective control of pneumatic pressure to the hold back bar actuator 118 also causes the piston rod 124 to be retracted back into the cylinder causing the hold back bar 116 to move back to its at home position shown in FIG. 2 and in FIG. 12. The hold back bar 116, provided just below the slide plate 62, is positioned to engage the row of objects just below the slipsheet 44 and the topmost layer of objects 42 when the topmost layer of objects is being swept off of the slipsheet and onto the slide plate 62, thereby preventing the sliding movement of the topmost layer of objects from causing any of the objects in the next lower layer from being knocked over. A collar 120 is mounted on the slide rod 102 and can be adjustably positioned along the length of the slide rod to adjust the distance the hold back bar 116 can be extended from the platform. The collar will engage against the trunion 98 on the forward cross brace to limit the hold back bar extension. Set screws secure the collar 120 to the slide rod 102. By adjusting the position of the collar 120 on the rod, the extension of the hold back bar 116 can be adjusted between the distance of the full extension of the piston rod 124 from the hold back bar actuator 118 to the hold back bar 116 being prevented from extending from the platform by adjusting the collar 120 to a position adjacent the trunion 98 on the forward cross-brace 66.

The platform 56 also supports a plurality of rollers 132 on the top of the platform that in turn support the slide plate 62. The platform rollers 132 are arranged around a plurality of retainer actuators 134. The retainer actuators are best seen in FIGS. 9 and 10. Each retainer actuator 134 is comprised of a cylinder having pneumatic pressure inlets 136 at its opposite ends. The rearward end of the cylinder is connected by a pivot connection 138 to the platform 56. A piston rod 142 extends from the forward end of the cylinder to a cam finger 144. A clevis or shackle 158 connects the piston rod 142 to the cam finger 144. The cam finger 144 is mounted for pivoting movement on a pivot pin 146 that extends along the forward edge of the platform 56. Each pressure inlet 136 at the opposite ends of the actuator cylinder 134 is connected by a fluid conduit shown in dashed lines to a pressure manifold 152, 154. One manifold 152 is supplied with pressure to retract the piston rod 142 into the actuator cylinder 134 and the other manifold 154 is supplied with pressure to extend the piston 142 from the cylinder 134. Pressure regulators are provided as part of the pneumatic pressure control system 202. The pressure regulators limit the pneumatic pressure supplied by the manifolds to the inlets 136 of the actuator 134 to a set maximum pressure. Known types of pressure regulators may be used for this purpose. The pressure regulators isolate the two sides of the piston (not shown) in the actuator cylinder 134 from each other and isolate each of the actuators 134 from each other so that an increase in pressure in one actuator will not influence the pressure in another actuator. The length of the piston rod 142 is determined so that the piston (not shown) in the actuator cylinder 134 will never bottom out by hitting either side of the cylinder interior. The length of the piston stroke is determined by the clevis or shackle 158 on the piston rod near the cam finger. When the selective pressure control extends the piston rod 142 from the cylinder actuator 134 it quickly projects from the cylinder and its stroke movement is only stopped by the clevis 158 striking the underside of the platform caused by the pivoting movement of the cam finger 144 about its pivot pin 146. The fully extended position of the piston rod 142 is shown in FIG. 9. To move the cam finger 144 to its lowered or retracted position shown in FIG. 9 a large pressure is supplied to the actuator 134 to quickly extend the piston rod 142. The same high pressure value used to extend the rod from the cylinder is also used to retract the rod back into the cylinder. The retraction of the piston into the cylinder is limited by the engagement of the clevis 158 with the front wall of the platform 56 as shown in FIG. 10. However, through experimentation, it was discovered that when the piston was retracted by the high pressure value and the cam finger extended above the slide plate 62 as shown in FIG. 10, the pressure in the actuator cylinder 134 was often too large to cause an object moving over the slipsheet 16 onto the slide plate 62 to depress the cam finger 144 below the slide plate 62 in operation of the retainer, yet to be explained. Also, where the retainer is employed in a plastic, blow-molded bottle manufacturing facility, it was observed that the higher pressure used to raise the cam fingers would also cause damage to bottles. For a short time after a plastic bottle is blow-molded it is still hot and its side could be indented by the cam finger where the pressure holding the fingers in their raised positions was too large. Therefore, a control 202 of the supply of pneumatic pressure to the actuator to raise the cam finger 144 was devised that would first supply the same high pressure value used to lower the finger 144 to also raise the finger above the slide plate 62, and then the control 202 would quickly decrease the pressure provided to the actuator 134 so that a lesser pneumatic pressure would hold the finger 144 in its raised position. This lower pneumatic pressure did not present the problem of requiring too great a force to push the finger back down into its retracted position nor would it cause damage to a freshly molded plastic bottle as it was swept over the finger in operation of the device.

The need for the separate pressure regulators was also discovered through experimentation. It was observed that an object moving over a raised finger 144 of the actuator causing the piston to move in the actuator would cause an increase in the pneumatic pressure in the actuator which would influence the pneumatic pressure in adjacent actuators. By discovering this problem through experimentation, separate regulators were provided for each actuator so that, if the pressure in one actuator is increased due to an object depressing the cam finger of that actuator, the increase in pressure would not affect the pressure in adjacent actuators. The top surface of the slide plate has a slight downward taper as it extends toward its leading edge. The taper increases the area between the top surface of the slide plate at its leading edge and the height of the raised fingers 44 above the slide plate for catching and retaining the slipsheet.

The slide plate 62 has slots 164 along its leading edge 82 that correspond to the positions of the retainer cam fingers 144. This is best seen in FIG. 4. With the slide plate 62 in its at home position shown in FIG. 10, the cam fingers 144 are free to be raised through the slots 164 at the end of the slide plate. When the slide plate 62 is extended relative to the platform 56 for palletizing operations illustrated in FIG. 9, the cam fingers 144 are not raised but are maintained in their retracted or lowered positions.

Figure 6:
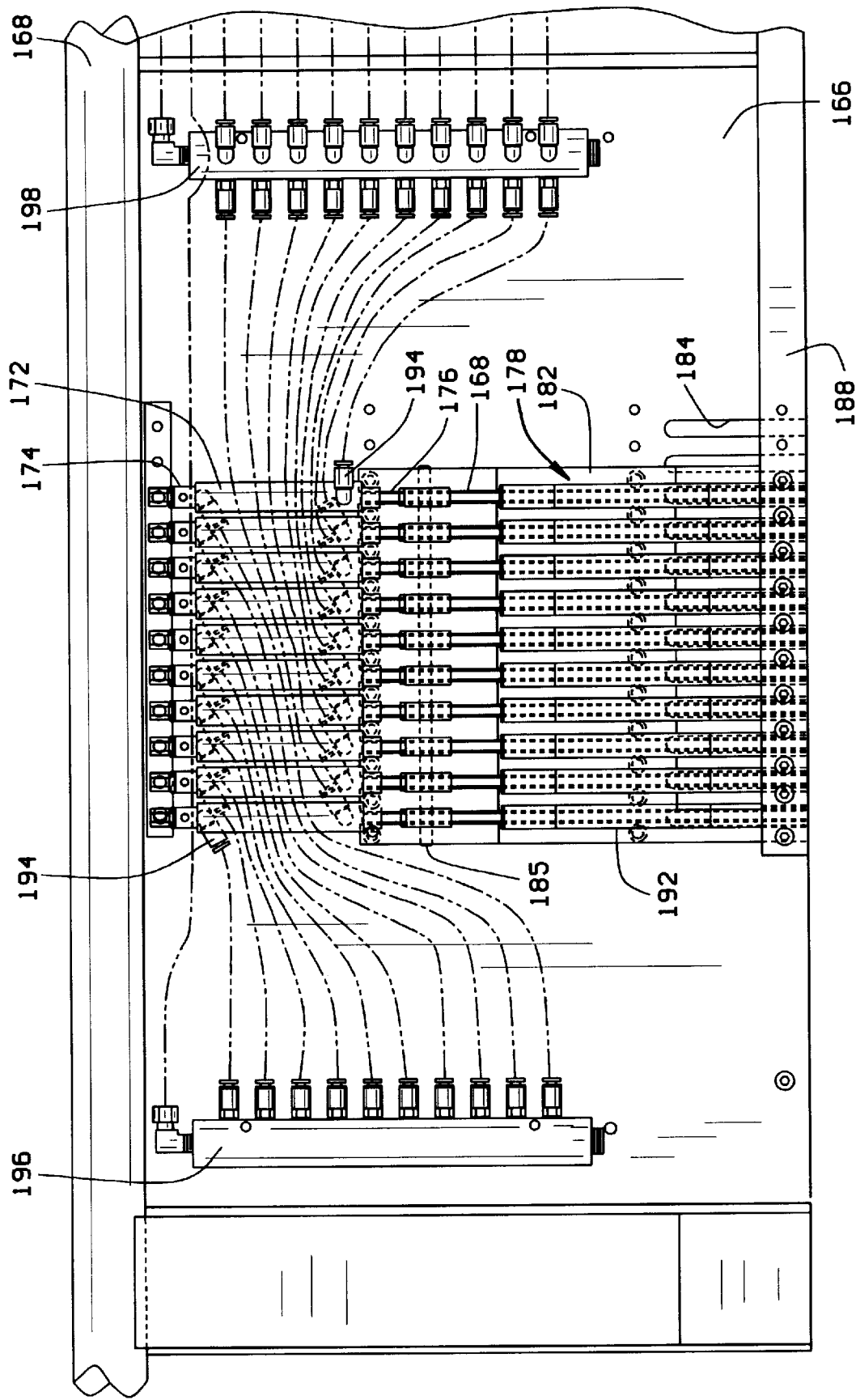
FIG. 6 is a partial elevation view of a sweeper mechanism side plate.

The slipsheet retainer of the invention also includes improvements made to the sweeper mechanism side plates 26 of the prior art apparatus. The improvements are made to the side plate that is closest to the elevator mechanism 34. Referring to FIG. 6, the improved side plate 166 is shown viewed from the point of view of the elevator mechanism 34. The rod 168 that extends across the top of the side plate 166 is the pivot rod that connects the side plate to the sweeper mechanism base 24 described earlier. The improved side plate 166 itself is basically the same as the prior art side plate and operates in the same manner. The improvement is provided by a plurality of hold down arms 168 and the arm actuators 172 associated with the arms. As shown in FIG. 6 and as shown in greater detail in FIGS. 7 and 8, each of the actuators 172 is a pneumatic cylinder having one end connected by a pivot coupling 174 to the side plate. A piston rod 176 projects from the opposite end of the actuator cylinder 172 and is connected to a hold down arm 168. Each hold down arm 168 is recessed in a groove 178 between rails 182 spacially arranged side by side on the side of the side plate 166. The rails 182 are spaced apart so that the groove 178 is sufficiently large to enable the actuator arm 172 to slide up/down, forward/rearward freely through the groove as viewed in FIGS. 7 and 8. Each of the hold down arms 168 is provided with an oblong slot 184 and a pin 186 passes through all of the rails 182 and the grooves 178 between the rails and through the oblong slots 184 of the actuator arms. Oblong openings 186 are also provided through the side plate 166 adjacent its bottom edge and corresponding to each of the grooves 178. A spring bar 188 is secured across the bottom edges of the rails 182 and a plurality of leaf springs 192 project from the spring bar 188 and engage against the hold down arm 168. Referring to FIG. 6, pressure inlets 194 at opposite ends of the actuator cylinder 172 are connected to two different pressure distribution manifolds 196, 198. The pressure distribution manifolds 196, 198 are in communication with a source of pneumatic pressure and are selectively supplied with pneumatic pressure to extend the piston rod 176 from the actuator cylinder 172 and retract the piston rod back in the actuator cylinder.

Figures 7, 8:
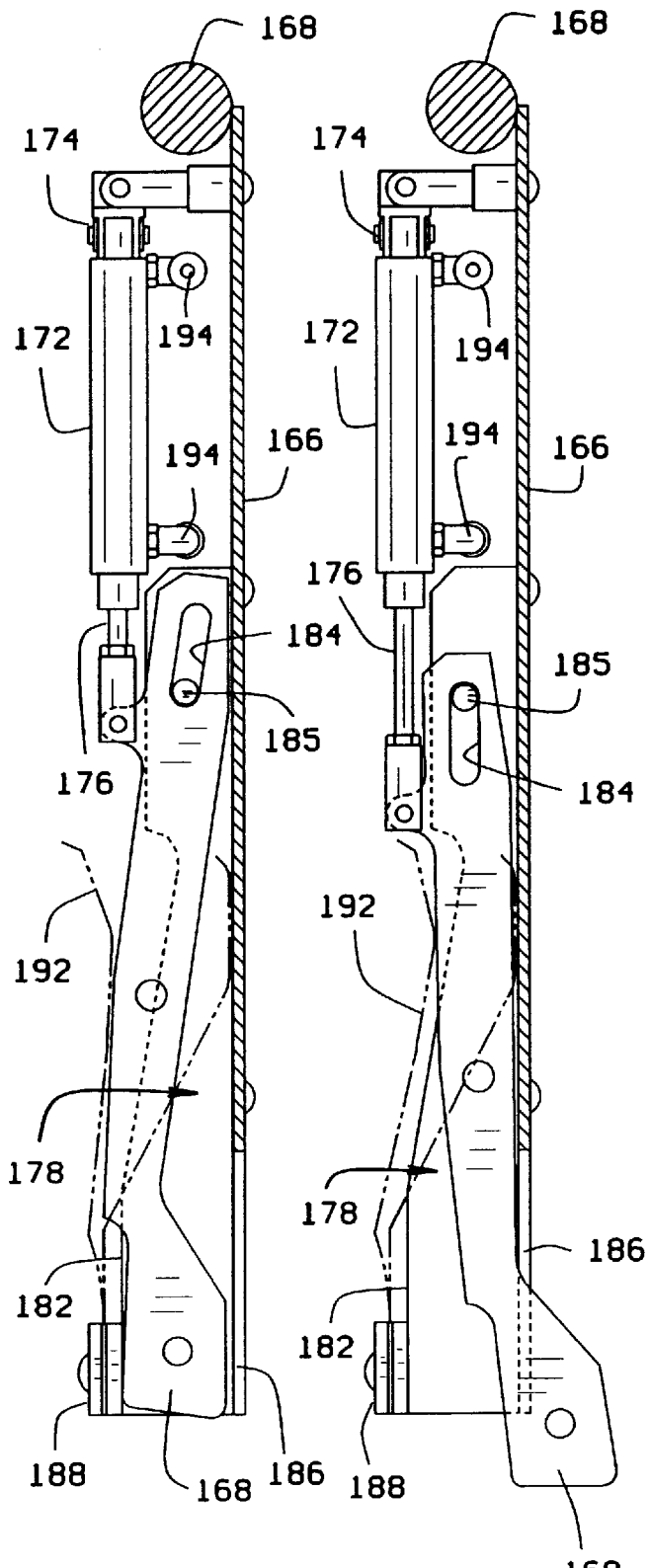
FIG. 7 is a side elevation view, in section, of the side plate of FIG. 6 showing an arm extended.
FIG. 8 is a side elevation view, in section, of the side plate of FIG. 6 showing an arm retracted.

Pneumatic pressure supplied by the pressure control system 202 to the manifold 196 shown on the left in FIG. 6 causes the piston rods 176 of the arm actuators 172 to be extended from the actuators as shown in FIG. 7. With the pivot connection provided by the pivot pin 185 extending through the oblong slots 184 of the arms, and with the leaf spring 192 exerting a biasing force on the left side of the arms as viewed in FIGS. 7 and 8, as the piston rod 176 is extended from the actuator cylinder 172 the arm moves downwardly and forwardly through the oblong opening 186 provided in the side plate 166. When the pneumatic pressure control system 202 provides pneumatic pressure to the manifold 198 and ceases the supply of pneumatic pressure to the manifold 196, the piston rod 176 is retracted back into the actuator cylinder 172 causing the arm to move upwardly and rearwardly. When the pivot pin 185 engages the bottom of the arm oblong slot 184, the arm moves back through the oblong opening 186 at the bottom of the side plate to the position shown in FIG. 8.

When the supply of pneumatic pressure is removed from the manifold 198 and applied to the manifold 196, this causes the hold down arms 168 to be moved downwardly and forwardly relative to the side plate 166, the arms are positioned relative to the platform 56 and slide plate 62 as shown in FIG. 10. In this positioning of the arms, it can be seen that they will engage the top of the slipsheet 44 adjacent its edge closest to the elevator section B and ensure that the edge is in a position where it can be engaged by the raised cam fingers 144 of the retainer. The hold down arms 168 are spacially arranged on the side plate 166 so that as the sweeper mechanism 22 is operated to cause it to sweep objects over the slide plate 62, the lowered arms 168 will pass between the raised cam fingers 44 of the retainer and thus not interfere with their operation of holding back the slipsheet 44 while allowing the objects to pass thereover.

The slipsheet retainer of the invention also includes an improvement to the sweeper mechanism 22. It has been observed that when sweeping a layer of lighter objects, for example a layer of freshly blow-molded plastic bottles, from a slipsheet 16, often the weight of the slipsheet left on top of the layer of objects being swept will significantly contribute to the friction force between the layer of objects and the lower slipsheet. The greater this friction force, the greater potential for an object being knocked over as it is swept off the lower slipsheet. This is especially significant in a complete pallet load of objects that often has a reinforcing frame constructed of wood or plastic on the top most slipsheet that covers the top most layer of objects. To overcome this problem, the slipsheet retainer of the invention includes a vacuum mechanism added to the sweeper mechanism 22 that lifts the slipsheet on top of the layer of objects being swept by the sweeper mechanism 22, thereby removing the weight of the slipsheet from the weight of the layer of objects being swept and reducing the friction force between the layer of objects being swept and the slipsheet beneath that layer of objects.

Figure 13:
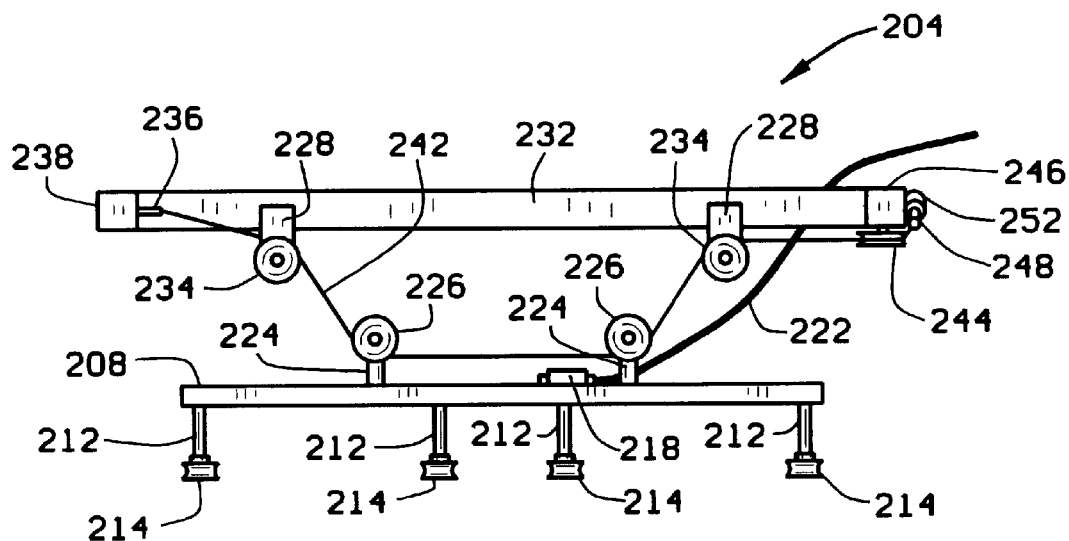
FIG. 13 is a side elevation view of a slipsheet lift mechanism.
Figure 14:
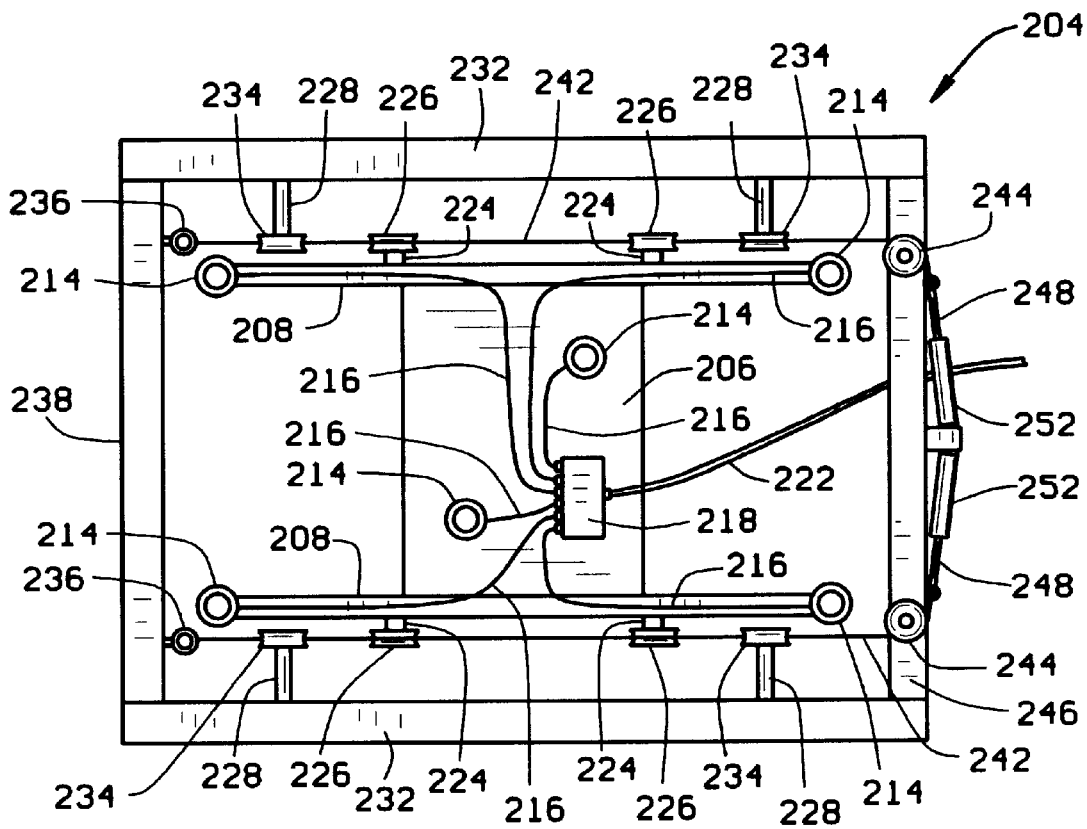
FIG. 14 is a bottom plan view of the slipsheet lift mechanism of FIG. 13.

Referring to FIGS. 13 and 14 there is shown a vacuum mechanism 204 that is suspended from the base 24 of the sweeper mechanism 22. To simplify the description of the vacuum mechanism, the side plates 26 of the sweeper mechanism have been removed from the base 24 together with their actuators, and the base 24 is shown as a rectangular framework. FIG. 13 shows a side elevation view of the vacuum mechanism 204 with the left side of the mechanism being closest to the elevator mechanism 34. FIG. 14 shows a view from beneath the sweeper mechanism looking up at its underside.

The vacuum mechanism 204 includes a base plate 206 that has a pair of elongated arms 208 at its opposite ends. At the opposite end of each arm 208 is a downwardly depending tube 212 that has a suction cup 214 at its lower end. A pair of tubes 212 also depend downwardly from the base plate 206 and also have suction cups 214 at their lower ends. Each of the tubes 212 has a vacuum hose 216 communicating therewith. The vacuum hose 216 extends from each of the tubes to a vacuum manifold 218. A vacuum pressure hose 222 extends from the vacuum manifold 218 to a vacuum pressure source (not shown). The vacuum pressure source is controlled by the overall pneumatic pressure control system 202 to selectively supply vacuum pressure to the manifold 218 just prior to operation of the sweeper mechanism sweeping a layer of objects either from a pallet load into the elevator section B when depalletizing, or from the elevator slide plate 36 onto a pallet load in the object infeed section A when palletizing. Pairs of brackets 224 extend upwardly from each of the elongated arms 208. Pulleys 226 are mounted for rotation on each of the brackets 224. Pairs of brackets 228 are mounted to opposite crossmembers 232 of the sweeper mechanism base framework and pulleys 234 are mounted for rotation on each of these brackets. A pair of eyelets 236 are secured to a cross bar 238 of the sweeper mechanism framework and cables 242 are secured to each of the eyelets 236. As best seen in FIG. 3, each of the cables extends from the eyelet 236 over a pulley 234 secured to the framework 232, then under the two pulleys 226 secured to one side of the elongate arms 208, and then back up over a pulley 234 secured to the framework and around another pulley 244 secured to the underside of the framework cross-bar 246 opposite the cross-bar 238 on which the eyelets 236 are mounted. The cables then connect with piston rods 248 projecting from cylinders 252 of a pair of pneumatic actuators. The pneumatic actuators 252 are selectively supplied with pneumatic pressure to retract the piston rods 248 into the actuators, and are vented to cause the piston rods 248 to extend from the actuators. From the arrangement of the cables 242 through the pulleys 234, 226, 244, it can be seen that when the piston rod 248 is retracted into the cylinder 252 of the pneumatic actuator, the cables 242 will be pulled through the pulleys causing the elongate arms 208 and base plate 206 of the vacuum mechanism to be raised toward the framework of the sweeper mechanism. In reverse, venting the air pressure from the actuator cylinders 252 will cause the piston rods 248 to be extended from the cylinders. The weight of the elongate arms 208 and base plate 206 will then cause the arms and base plate to be lowered relative to the framework of the sweeper mechanism.

In operation, when it is desired to lift the slipsheet off of the layer of objects to be swept, with the sweeper mechanism positioned over the layer of objects the piston rods 248 are extended from their actuator cylinders 252 causing the elongate arms 208 and the base plate 206 to be lowered onto the slipsheet. Vacuum pressure is then supplied through the supply hose 222 and the vacuum hoses 216 to the tubes 212 and suction cups 214. The vacuum pressure holds the slipsheet to the suction cups 214. The pressure is sufficient to hold a slipsheet having a picture frame reinforcement. Pneumatic pressure is then supplied to the cylinder actuators 252 to retract their piston rods 248 and raise the elongate arms 208 and base plate 206 toward the framework of the sweeper mechanism. With the slipsheet lifted off of the layer of objects to be swept, the weight of the layer of objects is reduced and so is its friction force on the slipsheet on which the layer of objects is positioned. With the reduction in the friction force between the layer of objects and the lower slipsheet, the layer of objects is swept more easily off of the slipsheet and onto the slide plate 36 of the elevator mechanism. Once the layer of objects is positioned on the slide plate 136, the actuator cylinders 252 are then vented causing the elongate arms 208 and base plate 206 to be lowered toward the layer of objects, and the supply of vacuum pressure is cut off from the supply hose 202 causing the suction cups 214 to release the slipsheet onto the top of the layer of objects swept onto the slide plate.

The operation of the vacuum mechanism 204 for a palletizing mode of operation is substantially the same as that discussed above for the depalletizing operation, only in reverse.

In all of the drawing figures the conduits supplying pneumatic pressure to the different actuators of the invention are shown in dashed lines in order to simplify the drawings. The supply of pneumatic pressure is controlled by the pressure supply control 202 represented schematically in FIG. 2. The supply of pneumatic pressure to each of the individual actuators or manifolds of the apparatus is programmable and adjustable at the pneumatic supply control 202 in a similar manner to that done in prior art devices.

In operation of the slipsheet retainer of the invention in a palletizing mode on a machine such as that shown in FIG. 1, the elevator mechanism 34 is first lowered until the slide plate 62 is adjacent the infeed conveyor 12 and the outfeed conveyor 38. The outfeed conveyor 38 is then operated in reverse to position a layer of objects in the object outfeed section C where they await sweeping by the sweeper mechanism 22. The sweeper mechanism 22 is then operated to surround the layer of objects and sweep the layer of objects onto the slide plate 62. In the palletizing mode the cam fingers 144 are retraced as shown in FIG. 9. The elevator mechanism is then operated to elevate the slide plate adjacent the slipsheet 44 placed on top of the wood pallet 18 awaiting the objects on the infeed conveyor 12 and in the object infeed section A or on a slipsheet on an already existing layer of objects. The pneumatic pressure supply control 202 is then operated to supply pressure to the actuator 58 that extends the slide plate 62 from the elevator mechanism 34 and into the object infeed section A. The actuator 58 extends the slide plate 62 its full six inch extension so that it extends over and overlaps the edge of the slipsheet 44 as shown in FIG. 9. With this positioning of the slide plate, the sweeper is then again activated to sweep the objects off of the slide plate and onto the slipsheet 16 on the pallet in the object infeed section A. The pneumatic pressure supply control 202 then again operates to cause the actuator 58 to retract the slide plate 62 to its at home position over the platform 56. The elevator mechanism 34 is then operated to move downwardly in the elevator section B in a position where it will receive the next layer of objects with a slipsheet thereon. The sweeper mechanism 22 sweeps the layer of objects onto the slide plate 62 in the same manner as previously described. After the next layer of objects is swept onto the slide plate 62 with an additional slipsheet on this layer of objects, the elevator mechanism is then again operated to raise the layer of objects so that the slide plate 62 is adjacent the slipsheet on top of the first layer of objects swept onto the pallet in the object infeed section A. The slide plate 62 is then extended its fully extension as was done in the previous sequence of steps and the sweeper mechanism 22 is operated to sweep the layer of objects from the slide plate onto the previously swept layer of objects and slipsheet in the object infeed section A. This sequence of steps is repeated for each layer of objects to be placed on top of the pallet 18 until the desired layers are achieved. The infeed conveyor 12 is then operated in reverse to remove the pallet load from the object infeed section A and a new pallet is placed on the conveyor in the object infeed section with a slipsheet thereon and the loading process just described is repeated.

In the depalletizing operation of the retainer of the invention employed on the machine of FIG. 1, a pallet load is positioned on the infeed conveyor 12 and in the object infeed section A. The elevator mechanism in the object infeed section A. The elevator mechanism 34 is then operated to raise the elevator so that the slide plate 62 is adjacent the topmost slipsheet 44. The pressure supply control 202 is then operated to extend the stroke limit actuator 84 and then extend the platform actuator 108 and the slide plate actuator 58 together. Because the stroke limit actuator 84 has been extended, the slide plate actuator cannot extend to its full six inch stroke but is limited to a four inch stroke, the same length stroke as the platform actuator 108. Therefore, both the slide plate 64 and the platform 56 move together simultaneously into the object infeed section to a position adjacent the topmost slipsheet 44 and topmost layer of objects 42 to be unloaded from the pallet. At the same time the pneumatic pressure supply control provides pneumatic pressure to the retainer actuators 134 causing the actuators to raise their cam fingers 144. Immediately after the supply of pressure is provided to the actuators 134 to raise the fingers 144, the pressure is decreased to a lesser value. The pneumatic pressure supply control 202 also supplies pressure to the hold back bar actuator 118 causing the hold back bar to be extended to its position shown in FIG. 11 where it is positioned adjacent the next lower object layer 48. This positioning of the hold back bar 116 ensures that the objects in the next lower layer are not knocked over by the sweeping motion of the topmost layer of objects 42.

The sweeper mechanism 22 is operated as conventionally done, however, when the side plates 26 are lowered around the topmost layer of objects 42, the pneumatic pressure supply control 202 is activated to supply pneumatic pressure to the hold down arm actuators 172 causing the arms to be moved to their lowered and forward positions shown in FIG. 7 and in FIG. 10. At this point in the operation of the retainer, the sweeper mechanism 22 is prepared to sweep the first layer of objects 42 off the slipsheet 44 and onto the slide plate 36, the positioning of the cam fingers 144 and the hold down arms 168 shown in FIG. 10 will ensure that the topmost slipsheet 44 will remain in place on top of the next lower object layer 48 as the topmost layer of objects 42 is swept by the sweeper mechanism 22 onto the slide plate 62. As the sweeper mechanism moves across the slide plate 62, the hold down arms 68 pass between the raised cam fingers 144. When the first row of objects comes into contact with the cam fingers 144, the movement of the objects due to the sweeping motion of the sweeper mechanism 22 will cause objects that engage with cam fingers 144 to move those cam fingers downwardly through their respective slots 164 enabling the objects to pass over the cam fingers forced down and onto the slide plate 62. Those cam fingers 144 that are between objects in the first row will remain in their raised positions and retain the slipsheet 44 from moving across the slide plate 62 with the first layer of objects. Regardless of the arrangement of the objects on the slipsheet, if there is a gap between objects at the edge of the slipsheet as the layer of objects is swept off the slipsheet, one or more of the cam fingers 144 will be raised into that gap and engage the edge of the slipsheet to retain it from sliding over the slide plate 62.

When the topmost layer of objects 42 has been swept onto the top of the slide plate 62, the pneumatic pressure supply control 202 is operated to retract the slide plate 62 and the platform 56 to their at home positions on the elevator mechanism 34 while also retracting the hold back bar 116. The hold down arms 168 are also retracted to their raised and retracted positions shown in FIG. 8. The elevator mechanism 34 and sweeper mechanism 22 are then operated in their conventional manner to deliver the swept layer of objects onto the outfeed conveyor 38 and then return to the next layer of objects and the slipsheet thereon to sweep this next layer of objects and the slipsheet thereon over the slipsheet below the layer of objects and onto the slide plate in the same manner as just described.

In the manner described above the slipsheet retainer of the present invention provides a method of retaining slipsheets under layers of objects swept from the slipsheets and onto elevator mechanisms in a depalletizing apparatus, where the slipsheet retainer does not interfere with the movement of a second pallet load of objects into the object infeed section of the depalletizing apparatus once the previous load of objects has been depalletized, thus providing time savings in the depalletizing operation and a more cost efficient operation. Furthermore, the slipsheet retainer of the invention may be employed in both depalletizing and palletizing modes, or can be modified by removing the slide plate actuator 58 and securing the slide plate permanently to the platform 56 where only the depalletizing function is needed.

While the present invention has been described by reference to a specific embodiment, is should be understood that modifications and variations of the invention may be constructed without departing from the scope of the invention defined in the following claims.

What is claimed:

1. An apparatus for depalletizing objects from a pallet where the objects are arranged in layers on the pallet with a sheet between adjacent layers of objects, the apparatus comprising:

a bay in which the pallet of objects is received;

a conveyor adjacent the bay where layers of objects can be moved from the bay and received by the conveyor;

a sweep supported on the bay for movement downwardly adjacent a topmost layer of objects on a pallet in the bay and movement horizontally to move the topmost layer of objects along a path of movement out of the bay and onto the conveyor;

a retainer between the bay and the conveyor where a sheet below the topmost layer is engaged by the retainer and prevented from moving toward the conveyor as the sweep moves the topmost layer of objects out of the bay and onto the conveyor, the retainer is movable between raised and lowered positions of the retainer relative to the path of movement of the topmost layer of objects moved by the sweep, where in the raised position the retainer is in the path of movement where it will engage the sheet and in the lowered position the retainer is out of the path of movement where it will not engage the sheet, the retainer includes a platform having a top sliding surface and a plurality of fingers mounted on the platform for movement between raised and lowered positions of the fingers relative to the top sliding surface, where in the raised positions of the fingers they extend above the top sliding surface and into the path of movement of the topmost layer of objects and where in the lowered positions of the fingers they are retracted below the top sliding surface and out of the path of movement of the topmost layer of objects.

2. The apparatus of claim 1, wherein:

the top sliding surface is on a slide plate mounted on the platform and the slide plate has a plurality of slots, and the fingers are positioned on the platform to pass through the slots as they are moved between their raised and lower positions.

3. The apparatus of claim 2, wherein:

the slide plate is mounted on the platform for movement of the slide plate between extended and retracted positions of the slide plate relative to the platform, where in the extended position of the slide plate the slide plate extends over a pallet received in the bay and in the retracted position of the slide plate the slide plate does not extend over a pallet received by the bay.

4. The apparatus of claim 2, wherein:

the slide plate is mounted on the platform for movement of the slide plate between extended and retracted positions of the slide plate relative to the platform where in the extended position of the slide plate the plurality of slots are spaced from the plurality of fingers and in the retracted position of the slide plate the plurality of slots are positioned above the plurality of fingers.

5. The apparatus of claim 2, wherein:

the platform is mounted on a base adjacent the bay for movement of the platform relative to the base and the bay between an extended position of the platform where the fingers are positioned in the bay and a retracted position of the platform where the fingers are outside the bay.

6. The apparatus of claim 5, wherein:

the slide plate is mounted on the platform for movement of the slide plate between extended and retracted positions of the slide plate relative to the platform where in the extended position of the slide plate the plurality of slots are spaced from the plurality of fingers and in the retracted position of the slide plate the plurality of slots are positioned above the plurality of fingers.

7. The apparatus of claim 1, wherein:

the retainer includes a plurality of pneumatic actuators and each pneumatic actuator of the plurality of pneumatic actuators moves one of the plurality of fingers between its raised and lowered positions.

8. The apparatus of claim 7, wherein:

each pneumatic actuator has a pressure regulator that limits air pressure in the pneumatic actuator to a maximum level.

9. The apparatus of claim 7, wherein:

a pressure control supplies air above a set pressure to the plurality of pneumatic actuators to cause the pneumatic actuators to raise the plurality of fingers and the pressure control supplies air below the set pressure to the plurality of pneumatic actuators after the pneumatic actuators have raised the fingers to maintain the fingers in their raised positions.

10. An apparatus for depalletizing objects from a pallet where the objects are arranged in layers on the pallet with a sheet between adjacent layers of objects, the apparatus comprising:

a bay in which the pallet of objects is received;

a conveyor adjacent the bay where layers of objects can be moved from the bay and received by the conveyor;

a sweep supported on the bay for movement downwardly adjacent a topmost layer of objects on a pallet in the bay and movement horizontally to move the topmost layer of objects along a path of movement out of the bay and onto the conveyor;

a retainer between the bay and the conveyor where a sheet below the topmost layer is engaged by the retainer and prevented from moving toward the conveyor as the sweep moves the topmost layer of objects out of the bay and onto the conveyor; and a hold back bar is positioned below the retainer where it will engage objects in a layer of objects below the topmost layer of objects as the sweep moves the topmost layer of objects out of the bay and onto the conveyor.

11. An apparatus for depalletizing objects from a pallet where the objects are arranged in layers on the pallet with a sheet between adjacent layers of objects, the apparatus comprising:

a bay in which the pallet of objects is received;

a conveyor adjacent the bay where layers of objects can be moved from the bay and received by the conveyor;

a sweep supported on the bay for movement downwardly adjacent a topmost layer of objects on a pallet in the bay and movement horizontally to move the topmost layer of objects along a path of movement out of the bay and onto the conveyor;

a retainer between the bay and the conveyor where a sheet below the topmost layer is engaged by the retainer and prevented from moving toward the conveyor as the sweep moves the topmost layer of objects out of the bay and onto the conveyor, the retainer is movable between raised and lowered positions of the retainer relative to the path of movement of the topmost layer of objects moved by the sweep, where in the raised position the retainer is in the path of movement where it will engage the sheet and in the lowered position the retainer is out of the path of movement where it will not engage the sheet; and a pneumatic actuator moves the retainer between its raised and lowered positions and a pressure control supplies air above a set pressure to move the retainer from its lowered position to its raised position and the pressure control supplies air below the set pressure to the retainer after the retainer has been moved to the raised position.

12. The apparatus of claim 11, wherein:

an elevator is supported on the bay for upward and downward movement relative to the bay and conveyor to position the topmost layer of objects on the pallet in the bay adjacent the conveyor.

13. The apparatus of claim 11, wherein:

the sweep has a plurality of arms mounted on the sweep for movement between raised and lowered positions of the arms relative to the sweep, and the arms are positioned on the sweep so that when the sweep is moved adjacent the topmost layer of objects on a pallet in the bay, when the arms are moved to their lowered positions the arms are positioned over the sheet under the topmost layer of objects, and when the arms are moved to their raised positions the arms are positioned to a side of the sheet under the topmost layer of objects.

14. The apparatus of claim 11, wherein:

the sweep has a vacuum mechanism attached thereto that is selectively actuated to raise a slipsheet off of the topmost layer of objects.

15. An apparatus for depalletizing objects from a pallet where the objects are arranged in layers on the pallet with a sheet between adjacent layers of objects, the apparatus comprising:

a bay in which the pallet of objects is received;

a platform having a top sliding surface adjacent the bay;

a sweep supported on the bay for movement adjacent a topmost layer of objects on a pallet in the bay and movement horizontally to move the topmost layer of objects along a path of movement across the sheet below the topmost layer of objects out of the bay and onto the platform top sliding surface;

a retainer between the bay and the platform, the retainer being movable between raised and lowered positions relative to the path of movement of the topmost layer of objects moved by the sweep, where in the raised position the retainer is in the path of movement where it will engage the sheet under the topmost layer of objects as the topmost layer of objects is swept across the sheet out of the bay and onto the platform top sliding surface, the retainer includes at least one pneumatic actuator that is operable to raise and lower the retainer, and a pressure control that supplies pressure above a set pressure to the pneumatic actuator to move the retainer from its lowered position to its raised position and supplies pressure below the set pressure to the pneumatic actuator to hold the retainer in its raised position.

16. An apparatus for depalletizing objects from a pallet where the objects are arranged in layers on the pallet with a sheet between adjacent layers of objects, the apparatus comprising:

a bay in which the pallet of objects is received;

a platform having a top sliding surface adjacent the bay;

a sweep supported on the bay for movement adjacent a topmost layer of objects on a pallet in the bay and movement horizontally to move the topmost layer of objects along a path of movement across the sheet below the topmost layer of objects out of the bay and onto the platform top sliding surface;

a retainer between the bay and the platform, the retainer being movable between raised and lowered positions relative to the path of movement of the topmost layer of objects moved by the sweep, where in the raised position the retainer is in the path of movement where it will engage the sheet under the topmost layer of objects as the topmost layer of objects is swept across the sheet out of the bay and onto the platform top sliding surface, the retainer includes a plurality of fingers mounted on the platform for movement of the fingers between raised and lowered positions relative to the platform where in the raised positions of the fingers they extend above the platform top sliding surface and into the path of movement of the topmost layer of objects and where in the lowered positions of the fingers they are retracted below the platform top sliding surface and out of the path of movement of the topmost layer of objects.

17. The apparatus of claim 16, wherein:

the retainer includes a plurality of pneumatic actuators and each pneumatic actuator of the plurality of pneumatic actuators moves one of the plurality of fingers between its raised and lowered positions and each pneumatic actuator has a pressure regulator that limits air pressure in the pneumatic actuator to a maximum level.

18. The actuator of claim 16, wherein:

the retainer includes a plurality of pneumatic actuators and each pneumatic actuator of the plurality of pneumatic actuators moves one of the plurality of fingers between its raised and lowered positions, and a pressure control that supplies air above a set pressure to the plurality of pneumatic actuators to raise the plurality of fingers and supplies air below the set pressure to the plurality of actuators to hold the plurality of fingers in their raised positions.

19. The apparatus of claim 15, wherein:

the sweep has a vacuum mechanism attached thereto that is selectively actuated to raise a slipsheet off of the topmost layer of objects.

* * * * *